United States Patent

[11] 3,609,506

| [72] | Inventors | James A. Frezzolini;<br>James J. Crawford, both of Ringwood, N.J. |
|---|---|---|
| [21] | Appl. No. | 792,318 |
| [22] | Filed | Jan. 21, 1969 |
| [45] | Patented | Sept. 28, 1971 |
| [73] | Assignee | Frezzolini Electronics Inc.<br>Hawthorne, N.J. |

[54] BATTERY APPARATUS
22 Claims, 2 Drawing Figs.

[52] U.S. Cl. .................................................. 320/39,
307/66, 307/150, 320/25
[51] Int. Cl. .................................................. H02j 7/04
[50] Field of Search ....................................... 307/66,
150, 151; 320/39, 25, DIG. 2; 321/47

[56] References Cited
UNITED STATES PATENTS

| 3,348,118 | 10/1967 | Watrous | 320/40 |
| 2,920,260 | 1/1960 | Goffstein | 307/150 X |
| 2,978,596 | 4/1961 | Robirds | 307/151 |
| 3,129,373 | 4/1964 | Godshalk et al. | 320/25 |
| 3,221,241 | 11/1965 | Greenberg et al. | 321/47 |
| 3,267,288 | 8/1966 | Maiden et al. | 307/66 |
| 3,313,995 | 4/1967 | Bach et al. | 320/25 |
| 3,341,764 | 9/1967 | Kongable | 307/66 |
| 3,440,517 | 4/1969 | Page et al. | 321/47 X |
| 3,465,237 | 9/1969 | Brookmire | 320/DIG. 2 |
| 3,348,060 | 10/1967 | Jamieson | 320/39 X |

FOREIGN PATENTS

| 1,053,481 | 1/1967 | Great Britain | 307/66 |

Primary Examiner—William M. Shoop, Jr.
Attorney—Paul Fields

ABSTRACT: Apparatus having an inverter portion for producing an alternating potential from a battery and a charger portion for charging the battery including a pair of input terminals adapted to be connected to a battery. The charger portion includes a pulse generator, a switching device for connecting the pulse generator with the input terminals in response to a control signal, voltage reference means, and regulating means for producing the control signal in response to the difference between the battery terminal voltage and the voltage reference means. The inverter portion includes an oscillator for producing an alternating signal of preselected frequency at a pair of output terminals. Switching means is provided to selectively connect the input terminals with the charger portion or the inverter portion to provide a compact and versatile device which may be used as an inverter and, after the battery has been discharged, as a charger to charge the same.

The apparatus further includes simple frequency test means for testing the frequency of the inverter output signal.

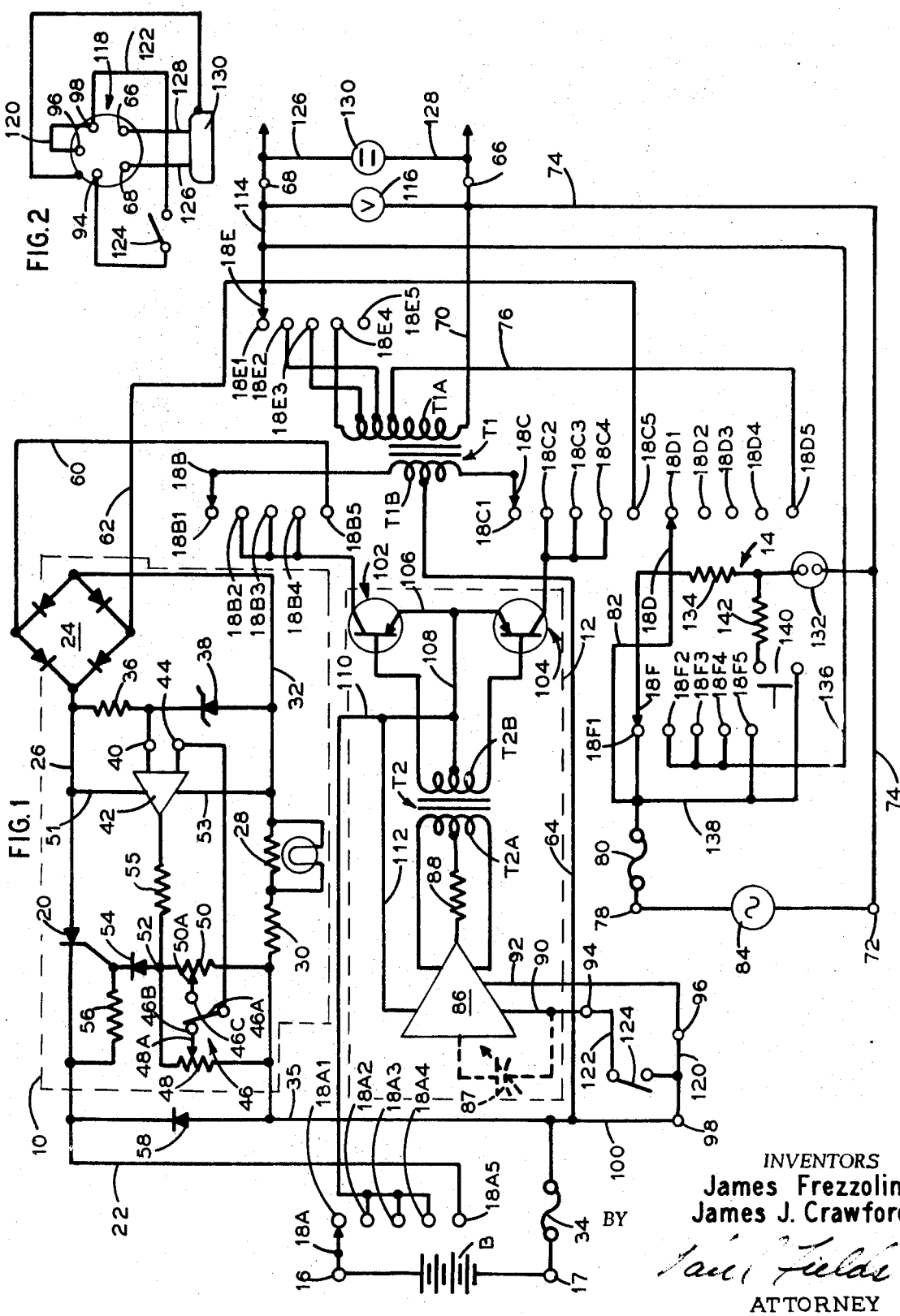

BATTERY APPARATUS

This invention relates generally to apparatus for use with a battery and, more particularly, pertains to apparatus which is selectively operable to convert the battery DC potential to an alternating potential or to charge the battery.

It is generally recognized that silver batteries or cells have an extremely high energy density (i.e., the amount of energy output from the battery per unit weight) as compared with similar types of batteries. Accordingly, these cells are highly desirable for use in portable electric or electronic devices. However, at present sliver-type batteries have not gained wide spread use due to the fact that problems have been encountered in attempting to charge such batteries. To be more specific, during the charging process the charging current must be continuously reduced as the cell or cells attain rated voltage otherwise the charging current may damage the battery. For example, if the battery charging current is not reduced, the battery may melt or ignite and consequently cause damage both to personnel and property.

Accordingly, an object of this invention is to provide an apparatus for charging a battery which reduces the charging current in proportion to the rise of battery potential.

Another object of this aspect of the invention is the provision of apparatus including a battery charger which is specifically adapted to charge silver batteries safely and efficiently and which is further adapted to charge any other type of battery such as a nickle-cadmium cell, a lead cell and the like.

A further object of the invention resides in the provision of battery charging apparatus which includes both voltage and current control as well as providing protection against incorrect or reversed connection of the battery to the apparatus.

Accordingly, apparatus constructed according to this aspect of the invention includes a pair of battery terminals adapted to be connected to the battery. A pulse generator is provided and switching means is also provided which is adapted to connect the pulse generator to the battery terminals in response to a central signal applied to a control electrode. The apparatus further includes voltage reference means and regulating means responsive to the difference between said voltage reference means and the battery terminal voltage for producing the control signal. Hence, the control signal controls the interval of operation of the switching means for each pulse produced by the pulse generator.

In many applications, it is desirable to provide a portable supply of energy for a load device which requires an alternating potential input. For example, most portable movie cameras of the type used by newsmen require an alternating energy supply. Since a newsman usually is out in the field where an AC source of energy is not convenient, he normally carries such a portable source. Presently, these sources comprise an inverter which is connected across the terminals of a battery. However, these inverters are usually bulky and heavy and, as a result, they are inconvenient to use and make it difficult for a cameraman to maneuver easily. Additionally, the control switches for such devices are connected in the main power circuit thereby requiring heavy duty elements and attendant increased costs. A further drawback of such prior art devices resides in the fact that the inverter will operate if the control switch is left in the operate position regardless of the fact that no load is connected to the device. Accordingly, the battery will discharge to render the device useless when it is desired to utilize the same.

Accordingly, another object of the present invention is to provide apparatus including an improved inverter.

A more specific object of this aspect of the invention is to provide apparatus having an inverter portion wherein the switches controlling operation of the inverter are connected in a low power circuit to effect a reduction in the power capabilities of such components.

Another object of the invention is the provision of an apparatus having an inverter portion of the type described which is operable only when an output cable is connected to the device to eliminate accidental discharge of the battery.

Accordingly, apparatus constructed in accordance with this aspect of the invention includes a pair of battery terminals adapted to be connected to a battery. An inverter is connected between the battery terminals and a pair of output terminals and includes an oscillator wherein a first lead connects the oscillator to one of the battery terminals and a second lead connects the oscillator to a control terminal. A removable cable is provided for connecting the control terminal to the other battery terminal to complete the energizing circuit for the oscillator.

Many load devices, such as movie cameras of the type noted above require an alternating input signal having a specific frequency. For example, most movie cameras of the type under consideration require a 60 Hz. input signal. In order to ensure that the output signal is of the desired frequency, frequency checking or determining circuits are provided in presently available inverters. However, these circuits usually are elaborate and complex, require a plurality of components which add to the overall weight and cost of the inverter, and are not particularly reliable.

Thus, another object of the present invention is to provide apparatus having a simple means for providing an accurate and reliable frequency check of the output signal.

As noted above, the present apparatus combines an inverter and a charger so that the battery quickly may be charged after the inverter has been used. Such an apparatus has particular importance for use in on-the-spot camera news recording as noted above, since it provides the reporter with a truly portable device which is a source of alternating energy when the camera is in use and which stores energy when the camera is not in use.

Accordingly, a further object of this invention is to provide an apparatus having features of battery chargers and inverters of the type described which utilizes common elements for both the charger and inverter operation to provide a compact and lightweight apparatus.

Another object and feature of this aspect of the invention resides in the novel details of the circuitry which provide an apparatus of the type described which is reliable in operation and economic to fabricate.

Accordingly, an apparatus constructed in accordance with this aspect of the invention includes a pair of battery input terminals, an inverter portion, a battery charger portion, and a pair of output terminals adapted to be connected to the inverter portion. Switching means operable between a plurality of positions is provided for connecting the battery input terminals with the battery charger portion for a first position of the switching means and for connecting said battery input terminals with said inverter and for providing a path between said inverter and the pair of output terminals for a second position of the switching means.

Other features and advantages of the present invention will become more apparent from a consideration of the following detailed description when taken in conjunction with the accompanying drawing, in which:

FIG. 1 is a schematic circuit wiring diagram of an apparatus constructed according to the present invention; and FIG. 2 is a diagrammatic wiring diagram of the male cable connector portion of the invention.

The apparatus of the present invention includes a battery charger portion designated generally by the reference numeral 10, an inverter portion designated generally by the reference numeral 12, and a frequency test portion designated generally by the reference numeral 14. As noted above, the apparatus is specifically adapted for use with a so-called silver cell or battery. However, it is emphasized that the subject apparatus provides a compact and lightweight device which may be utilized with any type of battery. For ease of reference, the battery charger portion 10 of the apparatus is first described. This is followed by a description of the inverter and frequency test portions of the invention.

More specifically, the apparatus of the present invention includes a pair of battery input terminals 16 and 17 which are adapted to be connected to the positive and negative electrodes, respectively, of a battery B. The terminal 16 is connected to the movable arm 18A of a multiple deck wafer switch 18. In the interest of clarity, the movable arm of each deck of the wafer switch will be designated by the numeral 18 followed by a different letter, and the terminals of each deck will bear the same letter designation but a respective numeral designation. For example, the reference character 18A3 identifies the 3 terminal on the A deck of the wafer switch 18 and the reference character 18C designates the movable arm of the C deck. Additionally, it is to be noted that the wafer switch 18 is of the type wherein the rotation of a single control (not shown) connects the movable arm of each deck with a correspondingly numbered terminal. That is, if the switch 18 is operated to connect arm 18A with the terminal 18A3, for example, the arms of the other decks will be connected to the 3 terminal associated with the respective decks.

The terminal 18A5 is connected to the cathode electrode of a silicon controlled rectifier or SCR20 a lead 22. The anode electrode of SCR20 is connected to the positive output terminal of an unfiltered full wave diode bridge rectifier circuit 24 by a lead 26. The negative output terminal of the rectifier circuit 24 is connected to one end of a pair of serially connected resistors 28 and 30 by a lead 32. The other end of the resistors 28, 30 is connected to the terminal 17 through a fuse 34 by a lead 35.

The charger portion 10 further includes a series circuit comprising a resistor 36 and a zener diode 38 connected across the output terminals of the bridge rectifier circuit 24, between the leads 26 and 32. The diode 38 is connected to be reverse biased to produce a substantially constant voltage drop, in the conventional manner. Connected to the junction of resistor 36 and zener diode 38 is one input terminal 40 of a differential amplifier 42. The other input terminal 44 of the amplifier 42 is connected to the armature 46A of a single-pole double-throw switch 46. One terminal 46B of the switch 46 is connected to the sliding arm 48A of a potentiometer 48 and the other terminal 46C of the switch 46 is connected to the sliding arm 50A of a potentiometer 50. The resistive segments of the potentiometers 48 and 50 are connected to the lead 35 at one end and to a junction 52 at the other end. The output terminal of the amplifier 42 similarly is connected to the junction 52 through a resistor 55 Leads 51 and 53 connect the amplifier 42 with respective leads 26 and 32 to provide an energizing path for the amplifier.

The two potentiometers 48 and 50 are provided so that signals of different values may be applied to the terminal 44 of the amplifier 42 so that more than one type of battery may be charged by the battery charger 10 simply by operating the switch 46. To be more specific, if one type or rating of battery is to be charged, the armature 46A is connected to the terminal 46B and the arm 48A of the potentiometer 48 is adjusted to obtain the desired signal at the input terminal 44. On the other hand, if a differently rated battery is to be charged the armature 46A is connected to the terminal 46C and the arm 50A of the potentiometer 50 is correspondingly adjusted. Once the potentiometers 48 and 50 have been adjusted, it is only necessary to operate the switch 46 to the desired terminal to obtain the proper input signal to the terminal 44 in accordance with the rating of the battery B. In light of the above, it is obvious that the versatility of the apparatus of the present invention is substantially increased.

The junction 52 is connected to the anode electrode of a diode 54. The cathode electrode of the diode 54 is connected to the gate electrode of SCR20 and to the lead 22 via a resistor 56. Connected between the leads 22 and 35 is a diode 58, the anode electrode of which is connected to the lead 35. The diode 58 is operable to protect the elements comprising the battery charger 10 and the battery B in the event that the battery B is connected to the terminals 16, 17 with reversed polarity, in the manner indicated below.

One input terminal of the bridge rectifier circuit 24 is connected to terminal 18B5 of the wafer switch 18 by a lead 60.

The other input terminal of the bridge rectifier circuit 24 is connected to terminal 18C5 by a lead 62. The arms 18B and 18C of the switch 18 are connected to the respective ends of the winding T 1B of a transformer T 1. The winding T 1B includes a center tap which is connected to the lead 35 by a lead 64. One end of the winding T 1A of the transformer T 1 is connected to an output terminal 66 of a pair of output terminals 66, 68, by a lead 70, and to an AC input terminal 72 by the lead 70 and a lead 74.

A tap on the winding T 1A is connected to terminal 18D5 of the wafer switch 18 by a lead 76. The movable arm 18D is connected to the other AC input terminal 78 through a fuse 80 by a lead 82. An AC source of energy, such as a source 84, is adapted to be connected between the terminals 72, 78. In practice, the source 84 may be obtained from a conventional house outlet by connecting a male plug to the input terminals 72 and 78.

When it is desired to charge a battery B, the discharged battery is connected between the battery input terminals 16, 17 and an alternating source of energy 84 is connected between the AC input terminals 72 and 78. The switch 46 is operated to connect the desired potentiometer 48 or 50 into the circuit in accordance with the battery rating, as noted above. For illustrative purposes it is assumed that the armature 46A is connected to the terminal 46B. The wafer switch 18 then is operated to connect the respective movable arms of each deck to the associated 5 terminal of the decks.

If the battery B is connected across the terminals 16, 17 with reversed polarity (i.e., the positive terminal of the battery connected to terminal 17) a substantially short circuit current will flow from terminal 17 through fuse 34, lead 35, diode 58, lead 22, terminal 18A5 and arm 18A to terminal 16 to cause the fuse 34 to blow. Thus, the diode 58 and the fuse 34 protect the circuit elements from being affected by a reversal of the battery and, more importantly, prevents the charger from charging the erroneously connected battery.

Assuming that the battery B is correctly polarized so that the charger portion 10 operates, energy will be applied to the bridge rectifier 24 from the source 84. To be more specific, the energized terminals 78 and 72 are connected across a portion of the winding T 1A of the transformer T 1 through the circuit comprising fuse 80, lead 82, arm 18D and terminal 18D5, lead 76, the winding T 1A, and leads 70 and 74. Since the winding T 1B is connected across the input terminals of the bridge circuit 24 through arm 18B, terminal 18B5, lead 60, arm 18C, terminal 18C5 and lead 62, an unfiltered full wave rectifier positive potential will appear on the lead 26 and a corresponding negative potential will appear on the lead 32. It is to be noted that the transformer T 1 functions as a matching transformer for charging since the charging potential must be greater than the terminal voltage of the battery to overcome the effects of the potential drops due to, for example, the internal resistance of the battery.

The maximum amplitude of the potential applied to the input terminal 40 of the differential amplifier 42 will be substantially constant due to the action of the back-biased zener diode 38. Assuming that the battery B initially is discharged, the potential on the lead 22 will be extremely low. The amplifier 42 saturates thereby producing a relatively high potential at the junction 52 which gates the SCR into conduction through the diode 54. Thus, a charging current flows through the battery B from the rectifier 24 through the circuit comprising lead 26, SCR 20, lead 22, switch 18, the battery B, fuse 34, lead 35, resistors 28 and 30, and the lead 32 back to the rectifier. A pilot lamp 29 is connected in parallel with the resistor 28 and is adapted to be illuminated when a current flows through the resistor to indicate to the operator that the charger portion 10 of the apparatus has been energized.

Since the junction 52 essentially is tied to the lead 22 through the diode 54 and the resistor 56, the potential at the junction 52 will follow the potential of the battery. Thus, when the battery is discharged the diode 54 will conduct very soon after the potential at the output of the rectifier bridge circuit 24 begins to rise. The conduction angle of the SCR 20 will be large and the average charging current will be high.

However, as the potential of the battery rises the diode 54 becomes back-biased until the potential of the junction 52 rises above the battery potential thereby forward biasing the diode and gating the SCR 20 into conduction. Since the conduction angle of the SCR decreases proportionately, the average current supplied to the battery B similarly decreases. Additionally, a portion of the signal appearing at junction 52 is fed back to the input terminal 44 via the potentiometer 48 to further control the potential at the junction 52 and thereby control the charging rate by controlling the conduction angle of the SCR 20. Accordingly, the charger portion 10 is operable to reduce the charging current as the battery terminal voltage increases to provide a charger which is safe to utilize in conjunction with the charging of silver batteries. When the battery B is fully charged the potential at the junction 52 will not rise above the potential on the lead 22. Hence, the diode 54 will not conduct and will not gate on SCR 20. Accordingly, charging automatically ceases. However, it is to be noted that even if the amplifier 42 may not produce a sufficient drive to gate on SCR 20 near the end of the charging cycle, the leakage current through the diode or unidirectional current conductive device 54 will complete the charging of the battery.

It is to be noted that the resistors 30 and 28 provide a current feedback path which protects the circuit elements and the battery B in the event of excessive current flow. To be more specific, if, for any reason, a short circuit current flows, an increased voltage drop appears across the resistors 28 and 30 to cause the differential amplifier to limit the charging current to a safe value.

It is to be noted that if the charging portion 10 is not energized, the diode 54 will prevent any current drain. That is, the battery B normally back-biases the diode 54 to prevent current flow therethrough from the battery. As a result, the battery B cannot accidentally be discharged if the operator forgets to operate the wafer switch 18 to the "OFF" position (wherein the respective arms engage the associated terminals of each deck).

The inverter portion 12 of the present apparatus includes an oscillator 86 having three output terminals. Two output terminals of the oscillator 86 are connected to the respective ends of the primary winding T 2A of a transformer T 2. The center tap of the winding T 2A is connected to the third output terminal of the oscillator 86 through a resistor 88. The energizing circuit for the oscillator 86 includes leads 90 and 92 which are connected to control terminals 94 and 96, respectively. Another control terminal 98 is connected to the lead 64 by a lead 100.

The respective ends of the secondary winding T 2B are connected to the base electrodes of transistors 102 and 104. The collector electrode of the transistor 102 is connected to terminals 18B2, 18B3 and 18B4 of the switch 18. In a similar manner, the collector electrode of the transistor 104 is connected to the terminals 18C2, 18C3 and 18C4 of the wafer switch 18. The emitter electrodes of the transistors are connected together by a lead 106. Additionally, a lead 108 connects the lead 106 with the center tap of the secondary winding T 2B, and a lead 110 connects the lead 106 with the terminals 18A2, 18A3 and 18A4 of the wafer switch 18. The transistors 102, 104 amplify the signal from the oscillator 86.

A lead 112 connects the lead 108 with the oscillator 86 to supply energy thereto in the manner noted below. In practice, the oscillator 86 may be a crystal-controlled oscillator which produces a signal of fixed frequency. Alternatively, however, the oscillator may take any other form, such as shown in FIG. 15-11 on page 260 of the book "Transistors: Principles and Applications" by R. G. Hibberd, published by the Hart Publishing Co., Inc. It is desirable, however, that the frequency of the oscillator 86 be variable if it is not crystal controlled. For example, a variable capacitor 87, as shown in phantom lines, may be provided so that the frequency of the oscillator and, therefore, the inverter output signal, may be varied to obtain a preselected frequency.

As noted below, when the inverter 12 is operating the arm 18B of the switch 18 is connected to any one of the terminals 18B2–18B4 and the arm 18C is connected to the corresponding one of the terminals 18C2–18C4. Accordingly, the output signal of the inverter portion 12 of the apparatus appears across the transformer winding T 1B so that this winding now functions as a primary winding. This is to be distinguished from the operation of the apparatus during charging wherein the winding T 1B functions as a secondary winding. As a result, savings in cost, materials and weight are obtained since the same element is used during either mode of operation of the apparatus.

The winding T 1A of the transformer T 1 which operates the secondary winding during the inverter mode of operation includes a plurality of taps which are respectively connected to terminals 18E2, 18E3 and 18E4 of the wafer switch 18. The arm 18E is connected to the output terminal 68 of the apparatus by a lead 114. These aforementioned terminals 18E2, 18E3 and 18E4 provide signals of different amplitudes so that the operator may select a desired output signal simply by connecting the arm 18E with the appropriate one of the terminals. Additionally, a voltmeter 116 is connected between the leads 70, 114 to visually indicate the value of the output signal.

In the past it has been found that many operators inadvertently leave the inverters energized even though the load has been disconnected or shut off. Obviously this action deenergizes the battery so that the inverter is useless to supply any further energy to a load device. The present invention eliminates the possibility of accidental discharge of the battery in this manner by requiring that a removable cable between the inverter portion 12 of the present apparatus and the load be connected to energize the inverter portion 12.

To be more specific, the control terminals 94, 96 and 98 and the output terminals 66 and 68 of the apparatus are individually connected to the respective sockets of the female portion of a conventional cable connector (not shown). In order to energize the inverter portion 12 of the apparatus the leads 90 and 92 of the oscillator 86 must be connected to the negative electrode of the battery B (or terminal 17). Accordingly, the male portion 118 of the cable connector (which is diagrammatically illustrated in FIG. 2) is provided with a lead 120 which connects the terminal 96 with the terminal 98 and a lead 122 which is adapted to connect the terminal 94 with the lead 98 through a single-pole single-throw switch 124 when the male portion of the cable connector is in position. Since the terminal 98 is connected to the negative electrode of the battery B or terminal 17 via leads 100, 64 and 35 and fuse 34, the lead 92 will be connected to negative terminal 17 through the lead 120. When terminal 96 is connected to terminal 98 and the arms of wafer switch 18 are connected to either one of the respective terminals 2–4, energy will be supplied to the oscillator 86 to warm up the same. When it is desired to operate the inverter portion 12 of the apparatus the switch 124 is closed thereby connecting the lead 90 to the terminal 98 via the lead 122. Thus, the energizing circuit to the oscillator 86 will be complete and the inverter portion will produce the desired output signal in the manner described below. However, it is to be noted that the removal of the male portion 118 of the connector breaks the aforementioned energizing connections of the oscillator 86 to prevent accidental energization thereof and eliminate the possibility of accidental discharge of the battery B. Additionally, it is to be noted that the switch 124 is connected in a relatively low power portion of the circuit. Thus, the power requirements of the switch are decreased so that a more economic element may be used.

As noted above, the output terminals 66 and 68 of the present apparatus are similarly connected to the cable connector. These terminals are connected, via the male portion 118 of the connector and leads 126 and 128, to a female plug or socket 130. A ground lead 132 (FIG. 2) connects the connector shield with the shield of the plug 130. Moreover, as is conventional, the shield of the male portion 118 will be connected to chassis ground when the portion 118 is in position so that all metallic parts will be properly grounded. The load device (not shown) is connected to the apparatus by means of the plug 130.

In operation, the load is connected to the inverter portion 12 of the apparatus via the plug 130 and the cable connector 118. The desired output potential is selected by operating the wafer switch 18 to connect the respective arms to terminal 2, 3 or 4 of the associated decks thereby to connect arm 18E to the appropriate tap of the transformer winding T 1A. It will be assumed that the arms of the switch 18 are connected to the respective terminal 2 of each deck.

The inverter portion 12 of the apparatus then is energized by closing switch 124. Accordingly, the oscillator 86 is energized from battery B through the circuit comprising arm 18A and terminal 18A2, lead 110, leads 108 and 112, leads 90 and 92, and through the cable connector to the other terminal of the battery, as noted above.

Since the actual operation of the inverter portion 12 is conventional, it will not be described in detail. If more information is desired, however, it may be obtained from the aforementioned reference "Transistors: Principles and Applications." Accordingly, a substantially square waveform appears between the output terminals 66, 68 to supply an alternating potential to the load device.

As noted above in many applications the proper operation of the load device requires the inverter output signal to be of the same frequency as is available from conventional AC mains. For example, a portable movie camera of the type noted above must be energized by a 60 Hz. source since the speed of the camera is effected by the frequency of the source. Thus, if the frequency of the power source is too high or too low synchronization of the resultant film will be difficult, if not impossible. In light of this, the frequency test portion 14 of the apparatus is provided so that the output signal can be adjusted visually to a 60 Hz. frequency. (As noted above it is assumed that oscillator 86 is provided with an adjustment device which controls the frequency of the signal produced by the oscillator.)

Accordingly, the frequency test portion 14 of the apparatus includes a lamp 132 which is connected between the lead 74 and arm 18F of the wafer switch 18 through a resistor 134. Terminal 18F1 is connected to the fuse 80 and terminals 18F2, 18F3 and 18F4 are connected together and to the lead 114 by a lead 136. A lead 138 connects terminal 18F1 to terminal 18F5 and to one contact of a normally open pushbutton switch 140. The other contact of the switch 140 is connected to the junction of the lamp 132 and the resistor 134 through a resistor 142.

In accordance with the example above, it is to be noted that the lamp 132 is energized by the inverter portion output signal through the circuit comprising lead 136, terminal 18F2 and arm 18F, resistor 134, the lamp 132 and lead 74. When it is desired to test the frequency of this output signal a source 84 of known 60 Hz. frequency is connected to the terminals 72, 78 and the pushbutton switch 140 is closed. Thus, the source 84 likewise is connected across the lamp 132 through the circuit including the lead 138.

If the signals from the source 84 and the inverter portion are exactly in phase or exactly out of phase and of the same frequency the lamp 132 will produce a steady glow or remain completely dark to indicate that the output signal is of the desired frequency. If the two signals are of the same frequency but slightly out of phase, the oscillator 86 will tend to lock into or 180° out of phase with the signal from the source 84. Thus, the lamp 132 again will produce a steady glow or remain completely dark to indicate the signal from the inverter portion 12 is of proper frequency. However, if the frequency of the inverter portion signal is not equal to the frequency of the standard source 84 a beat signal will be produced which causes the lamp 132 to flicker at the same rate as the beat frequency signal.

If the operator detects a flickering of the lamp 132, he varies the value of the adjustment device 87 until the flickering disappears. Hence, the output signal from the inverter portion of the apparatus will be of the proper frequency.

Accordingly, a simple and efficient means of testing the frequency of the output signal has been provided by the apparatus of the present invention to insure the proper operation of load devices.

It is to be noted that the lamp 132 is illuminated by the inverter output signal regardless of whether a frequency check is being made. Moreover, during the charging mode of operation of the apparatus the lamp 132 is illuminated by the source via lead 138, terminal 18F5 and arm 18F, resistor 134, lamp 132 and lead 74. Hence, since the lamp 132 illuminated for both modes of operation it also functions as a pilot light to indicate that the apparatus is in operation.

Thus, a compact and lightweight apparatus has been disclosed which incorporates means for charging a battery, for producing an alternating potential from a battery, and for testing the frequency of the output alternating signal in a single unit which is highly portable and reliable in operation.

While a preferred embodiment of the invention has been shown and described herein, it will become obvious that numerous omissions, changes and additions may be made in such embodiment without departing from the spirit and scope of the present invention. For example, it is obvious that the present invention may be used to produce a signal having any other desired frequency and the same may be checked by connecting a source having the desired frequency across the terminals 72, 78.

What is claimed is:

1. Apparatus for use in conjunction with a battery including a pair of battery input terminals adapted to be connected to the respective positive and negative electrodes of the battery; a pair of output terminals adapted to be connected across a load device; and inverter means between said battery input and output terminals for producing an alternating signal of preselected frequency at said output terminals; a first lead for connecting said inverter means to one terminal of said pair of battery input terminals, a control terminal, a second lead for connecting said inverter means to said control terminal, and removable cable means for selectively connecting said control terminal to said other one of said pair of battery input terminals whereby said inverter means is energized by the battery through the circuit including said first and second leads and said cable means.

2. Apparatus as in claim 1, in which said cable means includes a load device socket connected to said pair of output terminals.

3. Apparatus as in claim 1, in which said cable means includes a selectively operable switch for connecting and disconnecting said control terminal and said other terminal of said pair of battery input terminals.

4. Apparatus as in claim 1, further including frequency test means for testing the frequency of the signal appearing at said pair of output terminals, said frequency test means comprising a pair of alternating source input terminals adapted to be connected to a source of alternating potential having said preselected frequency, and indicating means connected across said pair of output terminals and said pair of alternating source input terminals for indicating the equality of the frequency of the inverter signal at said pair of output terminals and the frequency of the signal applied to said pair of alternating source input terminals.

5. Apparatus as in claim 4, in which said indicating means comprises a lamp operable to produce a flickering light when said inverter signal at said pair of output terminals and the signal applied to said pair of alternating source input terminals are not of the same frequency, and a switch for selectively connecting said lamp across said pair of alternating source input terminals.

6. Apparatus as in claim 5, and frequency varying means on said oscillator for varying the frequency of said oscillator to equalize the frequencies of the inverter and the alternating source signals.

7. Apparatus as in claim 1, and a transformer having a first and a second winding, first connecting means for connecting said first winding across said inverter means so that the output signal of said inverter means is applied to said first winding, said second winding having a plurality of taps, lead means for connecting one end of said second winding to one of said pair of output terminals, and second connecting means for selectively and individually connecting said plurality of taps to the other of said pair of output terminals, whereby signals of different amplitude may be applied between said pair of output terminals.

8. Apparatus as in claim 7, and signal indicating means connected across said pair of output terminals for indicating the amplitude of the signal applied thereto.

9. Apparatus as in claim 7 and battery charging means connected to said pair of battery input terminals for charging a battery connected thereto, said battery charging means including rectifying means for producing a unidirectional potential adapted to be connected to said first winding by said first connecting means, a pair of alternating source input terminals adapted to be connected to an AC source, said second connecting means being operable to selectively connect said pair of altenating source input terminals to said second winding, and regulating means for regulating the value of the charging current in accordance with the potential of said battery. alternating source input terminals to said second winding, 10. Apparatus as in claim 9, in which said regulating means includes switch means having an input electrode, an output electrode and a control electrode for establishing a path for current flow between said input and output electrodes in response to a control signal applied to said control electrode; lead means connecting said rectifier means, said input and output electrodes of said switch means and said pair of battery input terminals in a series loop; impedance means connected between said control and gate electrodes; and control means for applying said control signal to said control electrode.

11. Apparatus as in claim 10, and unidirectional current conducting means connected between said control means and one of said battery input terminals polarized to prevent current flow from a battery connected between said battery input terminals and said control means in the absence of said control signal.

12. Apparatus as in claim 10, and a diode connected between said pair of battery input terminals polarized to conduct a current when a battery is connected between said pair of battery input terminals with a predetermined polarity, and fuse means connected in series with said battery charger and one of said pair of battery input terminals for opening the circuit therebetween in response to current flow through said diode.

13. Apparatus including battery charging means for charging the battery, said apparatus including a pair of battery terminals adapted to be connected individually to the respective electrodes of a battery, a pulse generator for producing a train of pulses, switching means connected between said pulse generator and said pair of terminals and having a control electrode for applying said train of pulses to said battery terminals in response to a control signal applied to said control electrode, voltage reference means for producing a reference signal, and control means connected with said battery terminals and responsive to the difference between said reference signal and the battery terminal voltage for producing said control signal and for applying said control signal to said control electrode whereby said control electrode controls the interval of operation of said switching means for each pulse in said pulse train, said control means including a differential amplifier having a first input, a second input and an output lead means for connecting said output to said control electrode, said first input being connected to said reference means, and feedback means connected to said second input for applying a signal thereto proportional to the battery terminal voltage, a diode connecting said output with said control electrode and polarized to conduct when the signal at said amplifier output rises above the battery terminal voltage, said feedback means including a potentiometer connected between said diode and the other of said pair of battery terminals.

14. Apparatus as in claim 13, in which said pulse generator comprises an unfiltered full wave bridge rectifier adapted to be connected to a source of AC energy.

15. Apparatus as in claim 13, and reversal protection means for preventing charging of the battery in the reverse direction, said protection means including unidirectional current conducting means for conducting current in response to a reversal of said battery, and disconnect means for disconnecting said switching means from said pair of battery terminals in response to current flow through said current conducting means.

16. Apparatus including battery charging means for charging a battery, said apparatus including a pair of battery terminals adapted to be connected individually to the respective electrodes of a battery, a pulse generator for producing a train of pulses, switching means connected between said pulse generator and said pair of terminals and having a control electrode for applying said train of pulses to said battery terminals in response to a control signal applied to said control electrode, voltage reference means for producing a reference signal, control means responsive to the difference between said reference signal and the battery terminal voltage for producing said control signal and for applying said control signal to said control electrode whereby said control signal controls the interval of operation of said switching means for each pulse in said pulse train, and a unidirectional current conducting means connected between one of said pair of battery terminals and said control means polarized to prevent current flow from said battery through said control means in the absence of said control signal.

17. Apparatus as in claim 13, in which said switching means includes a silicon controlled rectifier having an anode electrode connected to the positive terminal of said bridge rectifier, a cathode electrode connected to one of said battery terminals adapted to be connected to the positive electrode of the battery, and a gate electrode corresponding to said control electrode.

18. Apparatus as in claim 13, in which said reference means comprises a zener diode.

19. Apparatus as in claim 13, including a resistor connected in series with said feedback means and said second input for preventing excessive current flow.

20. Battery-operated apparatus having an inverter portion for producing an alternating potential and a charger portion for charging a battery comprising a pair of battery input terminals; a battery connected between said pair of battery input terminals; said charger portion including a pulse generator for producing a train of pulses, a switching device connected to said pulse generator and having a control electrode for applying said train of pulses to said battery in response to a control signal applied to said control electrode, voltage reference means for producing a reference signal, and control means responsive to the difference between said reference signal and said battery terminal voltage for producing said control signal and for applying said control signal to said control electrode to control the value of the charging current; said inverter portion including signal means for producing an alternating signal of preselected frequency, a pair of output terminals adapted to be connected to said inverter, switching means operable between a plurality of different positions for connecting said battery with said charger portion for a first position of said switching means and for connecting said battery to said inverter and providing a path between said inverter and said pair of output terminals for a second position of said switching means, said signal means including an energizing circuit having a lead connected to one terminal of said battery, control terminal, a second lead connecting said signal means to said control terminal, and removable cable means for connecting said control terminal to the other terminal of said battery.

21. Battery-operated apparatus having an inverter portion for producing an alternating potential and a charger portion for charging a battery comprising a pair of battery input terminals; a battery connected between said pair of battery input terminals; said charger portion including a pulse generator for producing a train of pulses, a switching device connected to said pulse generator and having a control electrode for applying said train of pulses to said battery in response to a control signal applied to said control electrode, voltage reference means for producing a reference signal, control means responsive to the difference between said reference signal and said battery terminal voltage for producing said control signal and for applying said control signal to said control electrode to control the value of the charging current; said inverter portion including an oscillator for producing an alternating signal of preselected frequency, a pair of output terminals adapted to be connected to said inverter, and switching means operable between a plurality of different positions for connecting said battery with said charger portion for a first position of said switching means and for connecting said battery to said inverter and providing a path between said inverter and said pair of output terminals for a second position of said switching means; and a transformer having a first and a second winding, means for connecting said first winding to said switching means whereby said switching means connects said first winding to said pulse generator when in said first position and to said inverter to receive the alternating signal when in said second position, a source of alternating potential, means for connecting said second winding to said switching means whereby said switching means connects said second winding with said source of alternating energy when in said first position and to said output terminals when in said second position, and a frequency test device, means for connecting said frequency test device with said switching means whereby said frequency test device is connected across said output terminals for said second position of said switching means and across said source of alternating energy for said first position of said switching means, said alternating energy source having said preselected frequency, and connect means for selectively connecting said alternating energy source to said frequency test device when said switching means is in said second position, said frequency test device including indicating means for indicating the equality of the frequencies of said inverter alternating signal and the signal from said alternating energy source.

22. Battery-operated apparatus as in claim 21, in which said oscillator includes frequency varying means to vary the frequency of said oscillator to produce a signal of said preselected frequency.